United States Patent [19]

Winkelhake

[11] Patent Number: 5,676,424
[45] Date of Patent: Oct. 14, 1997

[54] SUPPORTED VEHICLE SEAT, THAT IS CAPABLE OF PIVOTING WITH AN ADJUSTMENT SYSTEM FOR THE INCLINATION AND/OR THE HEIGHT OF THE SURFACE OF THE SEAT

[75] Inventor: Bernd Winkelhake, Bückeburg, Germany

[73] Assignee: Gebr. Isringhausen GmbH & Co. KG, Lemgo, Germany

[21] Appl. No.: 512,721

[22] Filed: Aug. 8, 1995

[30] Foreign Application Priority Data

Aug. 9, 1994 [DE] Germany .................. 44 29 405.0

[51] Int. Cl.⁶ .................. A47C 1/12; A61G 15/00; B60N 2/02
[52] U.S. Cl. .................. 297/337; 297/325; 297/328; 297/344.13; 297/344.15; 248/421
[58] Field of Search .................. 297/337, 325, 297/328, 344.12, 344.13, 344.15, 344.16; 248/157, 421, 419

[56] References Cited

U.S. PATENT DOCUMENTS

| 4,067,533 | 1/1978 | Kazaoka et al. | 297/328 X |
| 4,072,287 | 2/1978 | Swenson et al. | 248/421 X |
| 4,125,242 | 11/1978 | Meiller et al. | 248/421 X |
| 4,382,573 | 5/1983 | Aondetto | 248/421 X |
| 4,513,937 | 4/1985 | Langmesser, Jr. et al. | 297/325 X |
| 4,529,158 | 7/1985 | Sauffer, Jr. | 297/328 X |
| 4,556,185 | 12/1985 | Takagi | 248/421 |
| 4,566,667 | 1/1986 | Yanagisawa | 248/421 X |
| 4,572,468 | 2/1986 | Lange et al. | 297/325 X |

FOREIGN PATENT DOCUMENTS

| 537098 | 6/1941 | United Kingdom | 248/421 |
| 2036159 | 6/1980 | United Kingdom | 297/344.13 |
| 2129678 | 5/1984 | United Kingdom | 297/344.15 |

Primary Examiner—Peter M. Cuomo
Assistant Examiner—Rodney B. White
Attorney, Agent, or Firm—Salter & Michaelson

[57] ABSTRACT

A seat for a vehicle with a scissor-like pivoting system and device for the adjustment of the inclination and/or height of the surface of the seat includes the feature that the device for the adjustment of the inclination and/or height must be space-saving and is not permitted to influence the pivoting system. Scissor-type sets of arms are proposed for the pivoting system whose upper arm-components are angularly adjustable and capable of being fixed relative to the remaining lower components of the same arm.

6 Claims, 3 Drawing Sheets

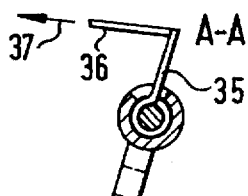
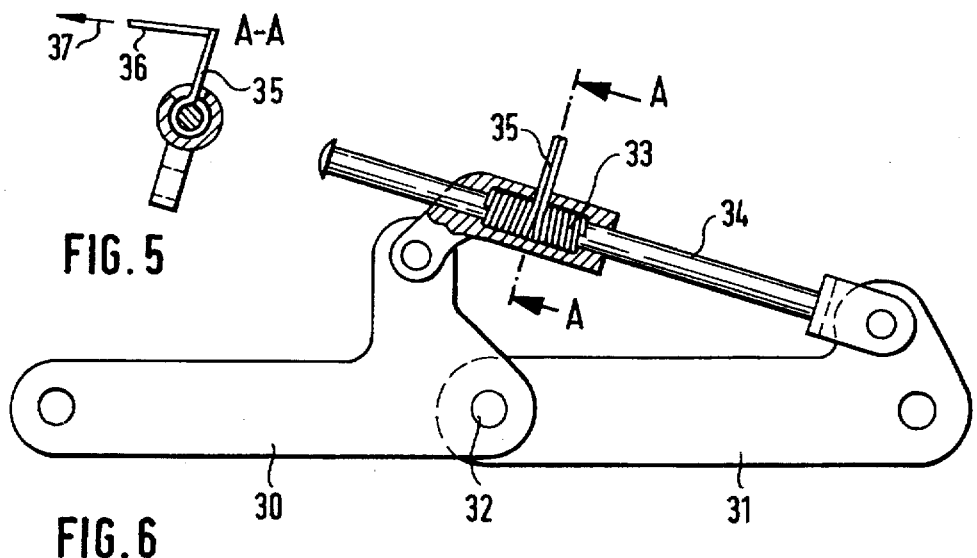
FIG. 5
FIG. 6
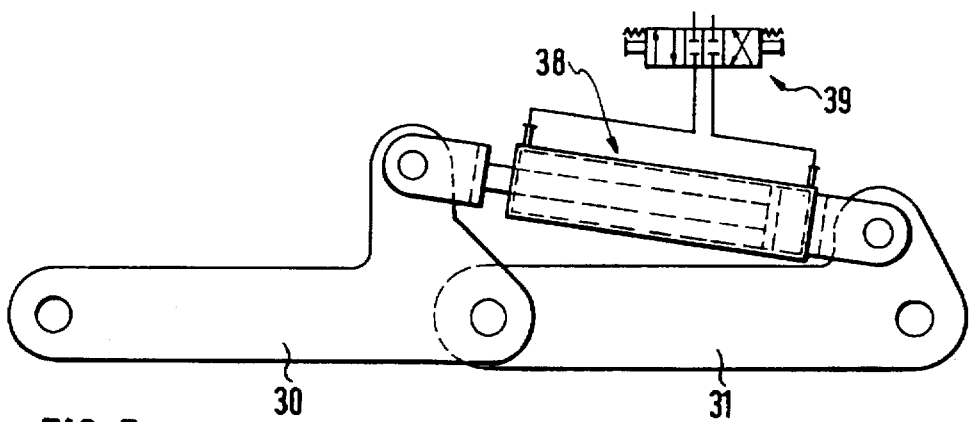
FIG. 7
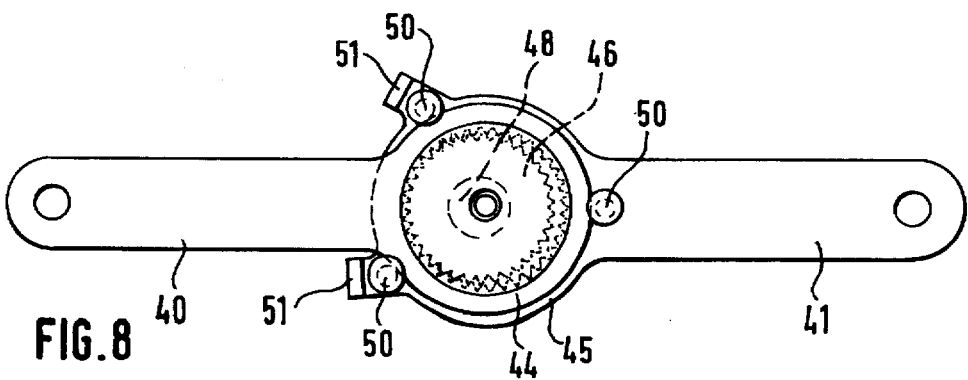
FIG. 8
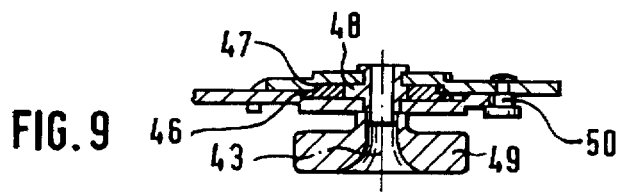
FIG. 9

SUPPORTED VEHICLE SEAT, THAT IS CAPABLE OF PIVOTING WITH AN ADJUSTMENT SYSTEM FOR THE INCLINATION AND/OR THE HEIGHT OF THE SURFACE OF THE SEAT

BACKGROUND AND SUMMARY OF THE INVENTION

The invention concerns a supported vehicle seat, that is capable of pivoting, whereby the surface of the seat is capable of adjustment in terms of its inclination (looked at in the direction of driving) and/or in terms of its height.

For the purpose of adjusting the height and/or the inclination of the surface of a seat, it is known that one can provide adjustable supporting levers or other supporting elements between the upper frame of the pivoting system and a further seat-surface frame that is assigned to the surface of the seat, namely in the front and rear regions of the surface of the seat so that the height of the surface of the seat or—as a result of adjusting only the front or only the rear supporting lever—the inclination of the surface of the seat can be changed by means of an equally dimensioned adjustment of all the supporting levers. Such a device between the upper frame of the pivoting system and the seat-surface frame requires considerable constructional space for incorporating all of the mechanical components of the supporting levers.

In order to reduce the space required for incorporating all the mechanical components it has become known that one can arrange the adjustable supporting levers or supporting elements only in the front region of the surface of the seat. Accordingly, they bring about only an adjustment of the inclination of the seat surface toward the rear. In order to facilitate the adjustment of the surface of the seat in terms of height also, it is known in the case of seats of this type that one can use a pivoting system that has crossing pair-wise scissor-type sets of arms that are connected to one another at their scissor-type crossing point by a horizontal pivoting axis (scissor-type joint), whereby the desired height adjustment of the seat surface can then he brought about by means of a steeper or flatter positioning angle of the scissor-type sets of arms that cross each other.

However, this has the disadvantage that the so-called static height of the pivoting system (that is the mid-ride position about which the seat pivots vertically during the operating procedure) is changed at the same time as the height adjustment of the seat surface. As a result, the geometrical articulation ratios of the other system elements of the pivoting system also change such as e.g. air springs, pivoting dampers or similar elements so that, as a result, the pivoting characteristics of the pivoting system are simultaneously changed, in total, along with the height adjustment of the seat surface that is carried out in this way.

The task of the invention is to provide a vehicle seat with a scissor-like pivoting system in which the desired inclination and/or height adjustment of the seat surface requires an amount of constructional space for incorporating all the mechanical components that is as small as possible and, in regard to the handling of which, no changes in the static height or other pivoting characteristics of the pivoting system occur.

In accordance with the invention, this task is accomplished by way of the feature that at least those scissor-type sets of arms in the front region of the seat-surface that are articulated at the upper frame of the pivoting system or those scissor-type sets of arms in the rear region of the seat-surface that are articulated at the upper frame of the pivoting system are formed, in each case, from two arm-components and that the two arm-components of a scissor-type set of arms are angularly adjustable relative to one another and are capable of being fixed in their respective angular adjustment positions relative to one another.

An especially advantageous form of embodiment of the invention provides the feature that each upper component of the scissor-type set of arms is angularly adjustable relative to the lower arm-component, namely in each case about the scissor-type joint of the pivoting system.

The angular adjustability of the upper arm-components in the front region of the surface of the seat or that in the rear region of the surface of the seat is adequate to achieve the adjustment of the inclination of the seat surface. If, however, the angularly adjustable arm-components are present both in the front region of the seat-surface and in the rear region of the seat-surface, then the desired height adjustment of the surface of the seat can also be achieved via an equally dimensioned angular adjustment of all the upper components of the scissor-type sets of arms relative to their respective lower components.

Basically, the teaching of the invention involves the feature that the upper angularly adjustable components of the scissor-type sets of arms are held freely in each case by all the articulated parts of other system elements of the pivoting system, that can influence the pivoting characteristics of the pivoting system such as, for example, air springs, pivoting dampers or similar elements. This corresponds completely to the usual convention in the assembly of known vehicle seats. There, such system elements are incorporated in such a way that, on the one hand, they are attached to the lower frame of the pivoting system and, on the other hand, they act on the scissor-type sets of arms underneath the scissor-type joints or on the scissor-type joints themselves. As a result of the use of these known types of assembly of the pivoting system, one ensures that the angular adjustment of the upper arm-component cannot lead, as a consequence, to the situation where anything changes in the pivoting characteristics of the pivoting system or in its static height.

The teaching of the invention also involves the feature that, basically, a further seat-surface frame that is assigned to the surface of the seat can be dispensed with and that the seat surface can now be mounted directly on the upper frame of the pivoting system. This is very favorable in terms of cost and saves space and weight.

The forms of embodiment of the invention in accordance with claims 3 through 6 are especially expedient in regard to the constructional implementation of angular adjustability and the fixing of the arm-components relative to one another.

BRIEF DESCRIPTION OF THE DRAWINGS

Examples of embodiments of the invention are described in more detail below using the drawings. The following aspects are shown.

3

FIGS. 5 & 6 show a scissor-type set of arms that is angularly adjustable and capable of being fixed by means of a rod/coiled spring element;

FIG. 7 shows a scissor-type set of arms that is angularly adjustable and capable of being fixed by means of an adjusting cylinder;

FIGS. 8 & 9 show a scissor-type set of arms that is angularly adjustable and capable of being fixed by means of a planetary wheel geared adjustment system.

DETAILED DESCRIPTION OF THE
PREFERRED EMBODIMENTS

Figure 1:
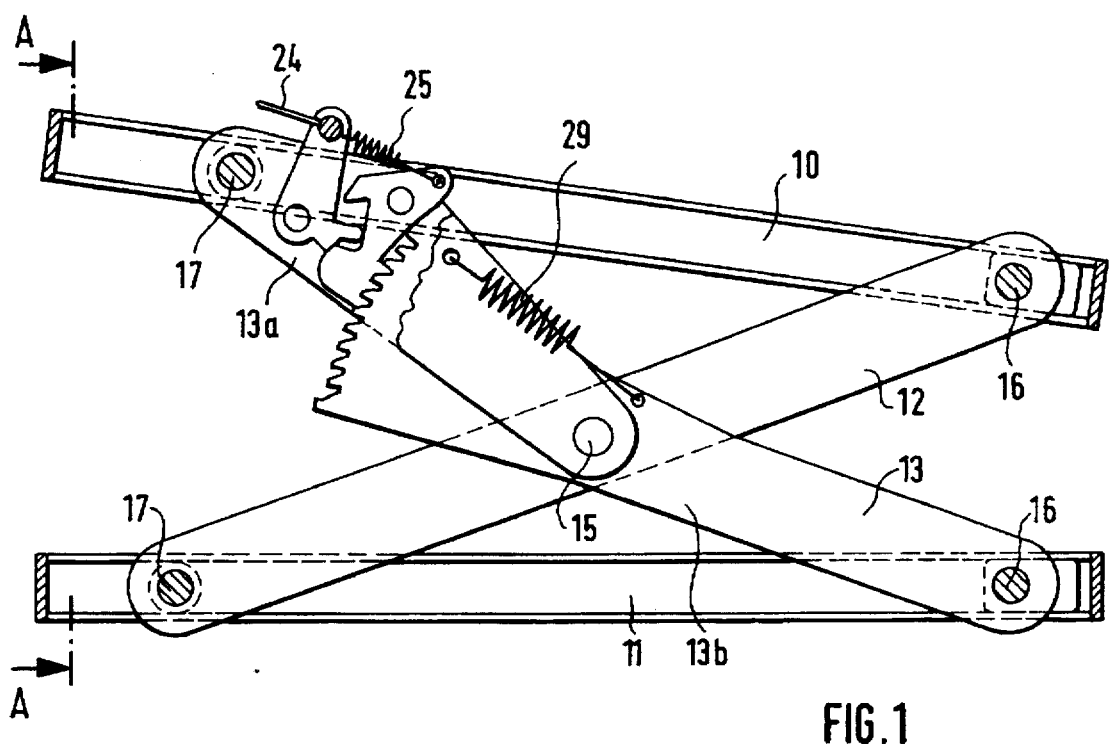
FIG. 1 shows a side view of a pivoting system with an integrated inclination adjustment system for the surface of the seat.
Figure 2:
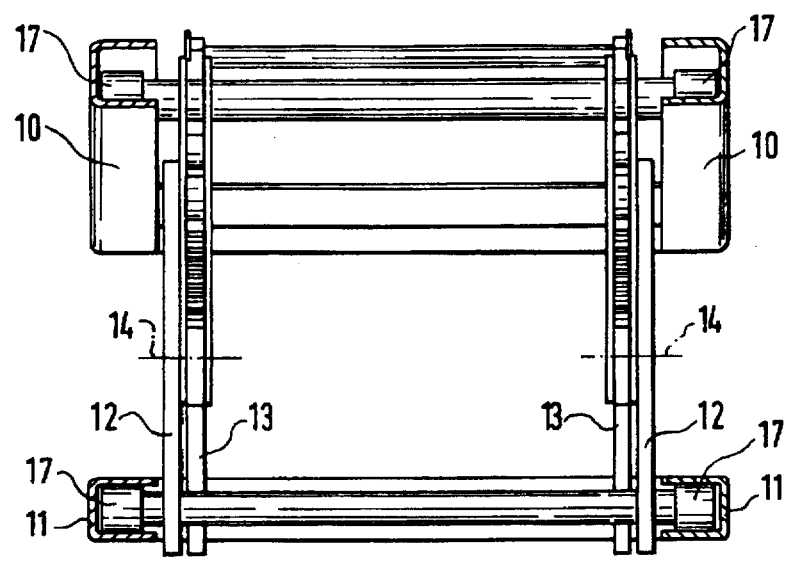
FIG. 2 shows a cross section through the pivoting system along the line A—A in accordance with FIG. 1.
Figure 3:
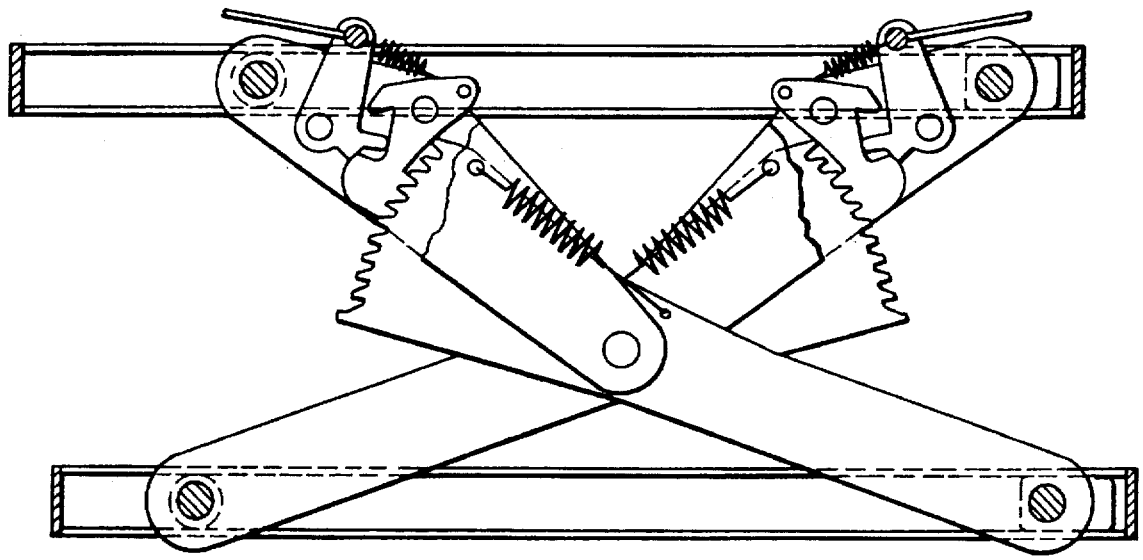
FIG. 3 shows a lateral view of a pivoting system with an integrated inclination and/or height adjustment system for the surface of the seat.

A pivoting system is illustrated in FIGS. 1 and 2 with an upper frame 10 and a lower frame 11. The lower frame 11 is linked, in a manner that transmits force, to the floor of the cabin of the vehicle in a way in which this is known in the case of vehicle seats in many variations. The surface of the vehicle seat is capable of being mounted directly on the upper frame 10. The seat surface can, for example, be a seating shell in upholstered form consisting of metal or plastic in a way in which this is known for vehicle seats. Since it is a known component, it is not illustrated in the drawing. At each side, the pivoting system that is illustrated possesses two pair-wise crossing scissor-type [sets of] arms 12 and 13 that are linked to one another at their scissor-type crossing point by means of a horizontal pivoting axis 14 (=scissor-type joint 15) and that are articulated in each case via their upper and lower ends either by means of a fixed rotary bearing 16 or by means of a rotary bearing that is capable of being displaced (=roller bearing 17) at the upper frame 10 or, as the case may be, at the lower frame 11. These are all known parts of the prior art and do not require a detailed description.

A new feature is that the scissor-type sets of arms 13 whereby, in each case, one of which is present at each side of the pivoting system (see FIG. 2) are formed in each case from two arm-components, namely the upper arm-component 13a and the lower arm-component 13b. Both components are angularly adjustable relative to one Ether about the scissor-type joint 15 and are capable of being fixed, relative to one another, in their respective angular adjustment positions.

Figure 4:
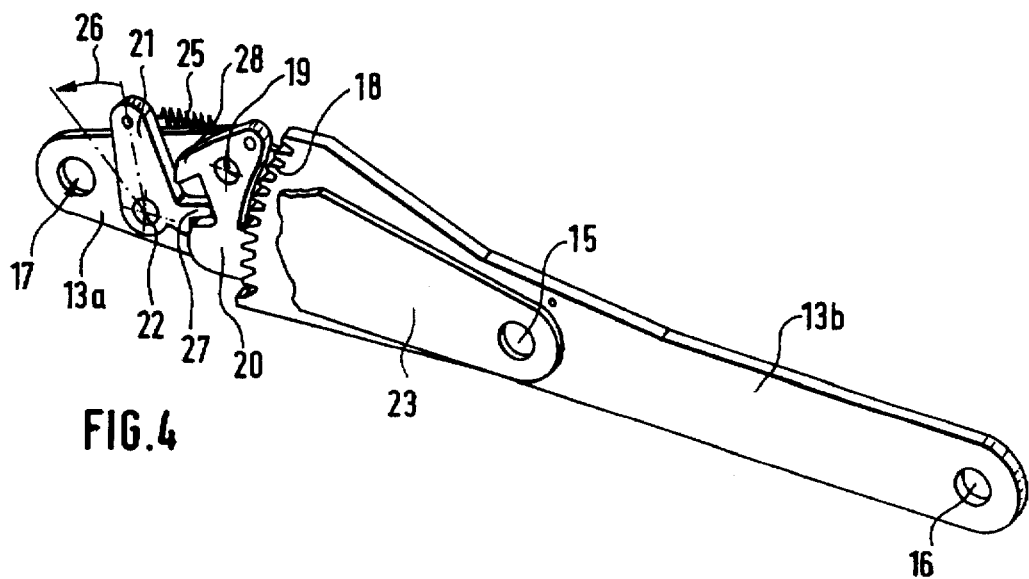
FIG. 4 shows a perspective detailed illustration of a scissor-type set of arms in accordance with FIGS. 1 through 3.

The angularly adjustable scissor-type set of anus 13 is illustrated in a pespective manner in FIG. 4. The lower arm-component 13b extends beyond the scissor-type joint 15 and is provided at its end there with an arc of teeth 18. A pawl 20, that is mounted in bearings, and in a manner that permits pivoting, on the upper arm-component 13a in the axis 19, engages with this arc of teeth, whereby the pawl is secured in its engagement position by means of the arresting lever 21. The arresting lever 21 is also mounted on the upper arm-component 13a in a manner that permits pivoting in the axis 22. The upper arm-component 13a is reinforced by means of a covering plate 23 that is shown only partially in the drawings. In terms of its contours, this covering plate is shaped accurately like the upper arm-component 13a and, together with this, jointly covers—in a sandwich-like manner—the arc of teeth 18, the pawl 20 and the arresting lever 21.

In order to activate angular adjustment of the scissor-type set of arms 13, the arresting lever 21 is pivoted against the force of the tensile spring 25 about its axis 22 in the direction of the arrow 26 (see FIG. 4) by means of a Bowden tensioning device 24 (see FIG. 1). In this way, its arresting nose 27 contacts the extension 28 on the pawl 20 and draws it out of engagement with the arc of teeth 18. After the opening of the engaged toothed segments, the angular adjustment position of the upper arm-component 13 can be freely selected relative to the lower arm-component. In this way, the tensile spring 29 (see FIG. 1) assists the angular adjustment in an upward direction so that the user of the seat can determine the desired angular adjustment position as a result of the more or less intense application of weight-based stress on the seat-surface region in which the upper arm-component 13a has been positioned.

FIG. 1 shows a form of embodiment of the invention by means of which the inclination of the surface of the seat can be adjusted. FIG. 2 shows a form of embodiment of the invention by means of which the inclination and/or the height of the surface of the seat can be adjusted. Both forms of embodiment use the angularly adjustable scissor-type sets of arms in accordance with FIG. 4.

FIGS. 5 through 9 show other examples of embodiment of angularly adjustable scissor-type sets of arms.

In accordance with FIGS. 5 and 6, the two arm-component 30, 31 are angularly adjustable about the joint 32 and are capable of being fixed relative to one another. For this purpose, use is made of a spiral spring element 33 that is mirror symmetrically formed relative to the intersection plane A—A, whereby the spiral spring element is positioned on the rod 34 and is capable of displacement thereon as soon as the shanks 35 of the spiral spring element are drawn in the direction of the arrow 37 by means of a Bowden tensioning device 36 or something similar.

FIG. 7 shows the two arm-components 30, 31 that are angularly adjustable relative to one another by means of a pressure impacted adjusting cylinder 38 and that are capable of being fixed in their respective angular adjustment positions relative to one another by way of the feature that the pressure medium feed lines and/or drainage lines to the adjusting cylinder are capable of being blocked by means of a conventional commercially available valve 39. As far as the pressure medium is concerned, use can be made of both air or a hydraulic liquid.

FIGS. 8 and 9 show two arm-components 40, 41 that are capable of angular adjustment relative to one another about the joint axis 43. Angular adjustment takes place by means of a planetary wheel geared adjustment system that is known in terms of its basic constructional assembly. It consists, in essence, of two internally toothed hollow wheels 44 and 45 and an externally toothed eccentric wheel 46 that simultaneously meshes with both hollow wheels.

One hollow wheel 44 is a component of the left arm-component 40 in accordance with the figure and possesses the internal set of teeth 46. The other hollow wheel 45 is a component of the right arm-component 41 in accordance with the invention and possess the internal set of teeth 47. The internal sets of teeth 46 and 47 have a different number of teeth; for example, the internal set of teeth 46 is provided with 38 teeth and the internal set of teeth 47 is provided with 31 teeth.

The eccentric wheel 46 is adjusted by means of the hand wheel 49 that is positioned on the eccentric shaft 48. The eccentric wheel engages simultaneously with the internal set of teeth 46 of the hollow wheel 44 (=left arm-component 40) and with the internal set of teeth 47 of the hollow wheel 45 (=right arm-component 41). Since the eccentric wheel also has a different number of teeth for each engagement (e.g. 35 teeth for the engagement with the internal set of teeth 46 of the left arm-component and 38 teeth for the engagement with the internal set of teeth 47 of the right arm-component), rotation of the hand wheel 49 produces an angular adjustment, relative to one another, of the two arm-components of the scissor-type sets of arms.

The aforementioned planetary wheel geared adjustment system is simple in its constructional assembly and is installed by means of three pinions 50 that have, in each case, a head-type stop and are riveted to the right arm-component 41. The shoulders 51 form the end stops in each case for the angular adjustment of the arm-components relative to one another. Since the teeth of the planetary wheel geared adjustment system are constructed in a self-braking manner, the arm-components are basically fixed in their respective angular adjustment positions in the event of non-activation of the hand wheel 49.

What is claimed is:

1. A seat for a vehicle comprising a seat, and means for adjusting the inclination and height of the seat, said adjusting means comprising a pivoting system having an upper frame and a lower frame, and two pair of crossing scissor-type sets of arms on opposite sides of the pivot system, the arms of the scissor-type sets being connected to one another at a scissor-type crossing point by means of a horizontal pivoting axis as a scissor-type joint and being articulated at upper ends with the upper frame and at lower ends with the lower frame, the scissor-type sets of arms in at least one of a front region of the seat that is articulated at the upper frame of the pivoting system and a rear region of the seat that is articulated at the upper frame of the pivoting system being formed from two arm components articulated to one another at the horizontal axis of the scissor-type joint, the two arm components of a scissor-type set of arms being angularly adjustable relative to one another and being capable of being fixed in respective angular adjustment positions relative to one another.

2. A seat as set forth in claim 1, an upper component of the scissor-type set of arms being angularly adjustable relative to and pivotally connected to a lower component about the scissor-type joint.

3. A seat as set forth in claim 2, one of the upper and lower components including an inter-meshing toothed segment having an arc of teeth, the segment being selectively engageable with a pawl pivotally mounted to one of the upper and lower frames for enabling the pivoting movement of the other of the upper and lower components.

4. A seat as set forth in claim 2, said pivoting system comprising a spiral spring element that is slidably adjustable on a rod, said spring element being pivotally connected to one of the upper and lower components and said rod being pivotally connected to the other of the upper and lower components.

5. A seat as set forth in claim 2, said pivoting system comprising an adjusting cylinder that is pivotally connected at one end thereof to the upper component and pivotally connected at another, opposite end thereof to the lower component.

6. A seat as set forth in claim 2, said pivoting system comprising a self-braking, planetary wheel geared adjustment system having two internally toothed hollow wheels, one being connected to the upper component and the other being connected to the lower component, and an externally toothed eccentric wheel which meshes with both hollow wheels.

* * * * *